No. 638,609. Patented Dec. 5, 1899.
F. F. THILL.
DRAFT EQUALIZER.
(Application filed Oct. 14, 1899.)

(No Model.)

WITNESSES:

INVENTOR

BY

ATTORNEYS

UNITED STATES PATENT OFFICE.

FRANK F. THILL, OF WHEATON, MINNESOTA.

DRAFT-EQUALIZER.

SPECIFICATION forming part of Letters Patent No. 638,609, dated December 5, 1899.

Application filed October 14, 1899. Serial No. 733,613. (No model.)

*To all whom it may concern:*

Be it known that I, FRANK F. THILL, of Wheaton, in the county of Traverse and State of Minnesota, have invented a new and Improved Draft-Equalizer, of which the following is a full, clear, and exact description.

The object of my invention is to provide an effective draft-equalizer for four horses which is especially adapted for application to harvesters or mowing-machines, whereby three horses may be worked at the right-hand side of the pole and a fourth horse at the left-hand or grain side of the pole, and to so construct the device that all side draft will be obviated.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
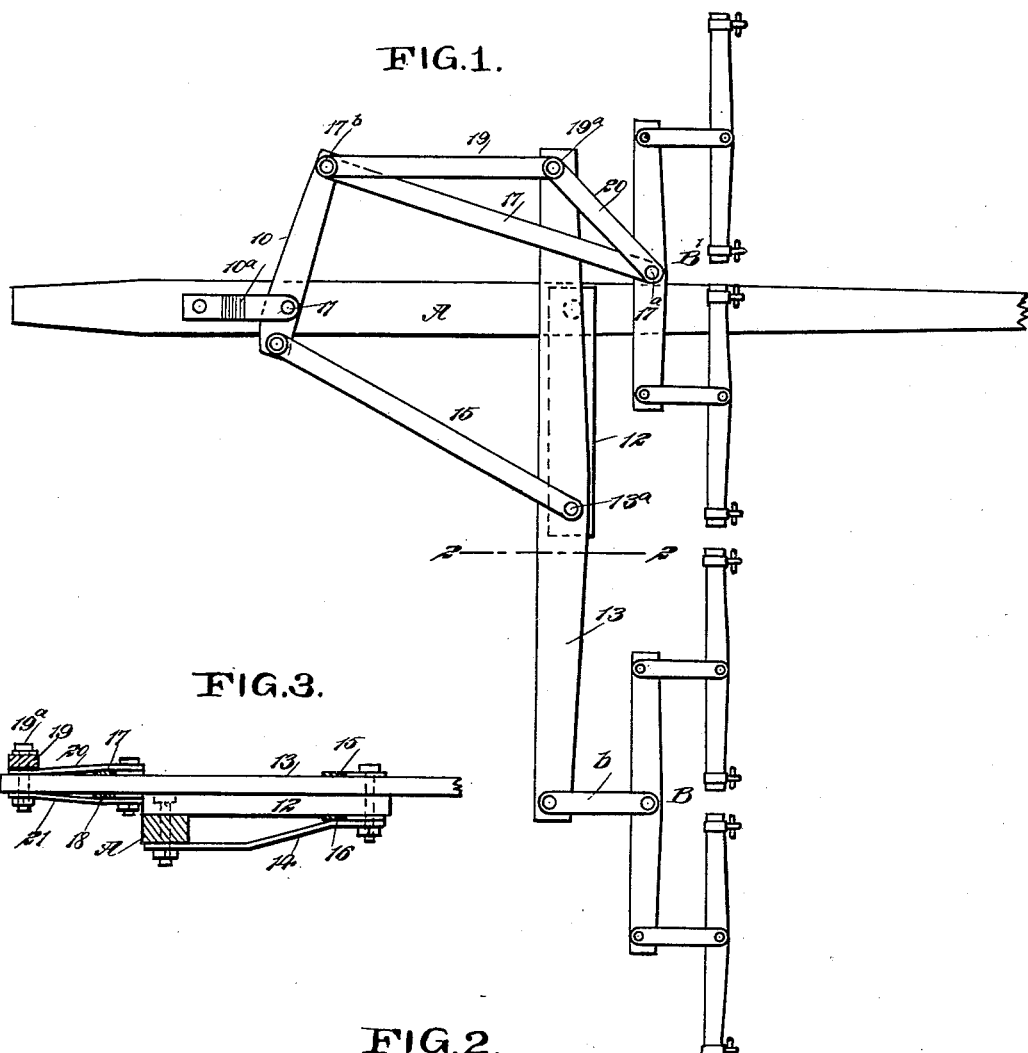
Figure 3:
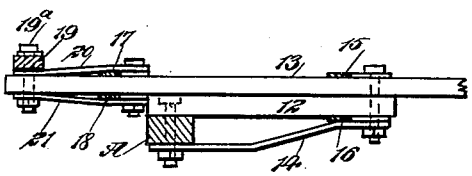
Figure 2:
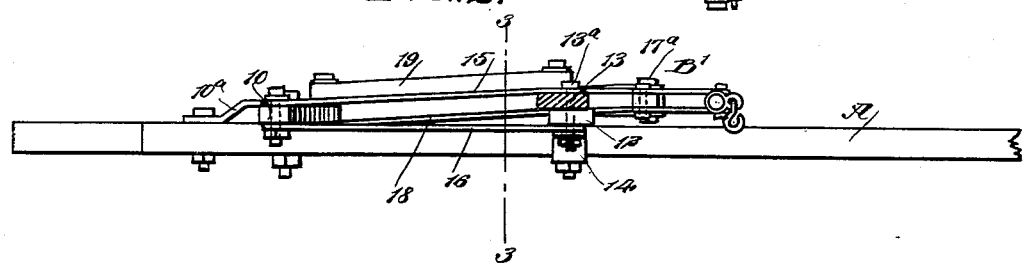

Figure 1 is a plan view of the improved device applied to the pole of a vehicle. Fig. 2 is a longitudinal vertical section taken practically on the line 2 2 of Fig. 1, and Fig. 3 is a transverse section taken substantially on the line 3 3 of Fig. 2.

The pole or tongue A is of the usual construction. Near the inner end of the said pole or tongue a fulcrum-bar 10 is pivoted between its center and its right-hand end between the upper surface of the pole or tongue A and a bracket $10^a$, as shown in Figs. 1 and 2, the pivot-pin of the said fulcrum-bar being designated by the reference-numeral 11. An arm 12 is rigidly secured to the pole or tongue A in front of the pivot 11 of the fulcrum-bar, the said arm being preferably attached to the upper surface of the pole or tongue, and it extends at right angles thereto in direction of the right-hand side of the pole, as is best shown in Fig. 1.

An equalizing-bar 13 is pivoted, by means of a suitable pin $13^a$, on the outer end portion of the arm 12, the pivot-pin $13^a$ being located at the right-hand side of the center of the said equalizing-bar 13. The arm 12 is held steady by means of a brace 14, which is attached to the tongue or pole A and to the outer end of the arm 12 at its under side, the pivot-pin $13^a$ serving to hold the outer end of the brace 14 in place. Parallel straps 15 and 16 extend from the pivot-pin $13^a$ of the equalizing-bar 13, the strap 15 being located at the upper surface of the equalizing-bar and the strap 16 between the brace 14 and the bottom of the arm 12. These straps 15 and 16 are carried rearward and are pivotally attached to the shorter end of the fulcrum-bar 10, as shown in Figs. 1 and 2.

A connecting-bar 19 extends from the left-hand end or grain side of the equalizing-bar 13 to the corresponding end portion of the fulcrum-bar 10, and the said connecting-bar 19 is located upon the upper faces of the equalizing-bar and the fulcrum-bar. Two doubletrees B and B' are employed, the doubletree B being pivotally attached to the right-hand extremity of the equalizing-bar 13, while the opposing doubletree B' crosses the pole or tongue A and is located adjacent to the left-hand end or grain side of the said equalizing-bar. The right-hand doubletree B is connected by suitable links *b* directly with the equalizing-bar 13; but the left-hand doubletree B' is connected not only with the equalizing-bar 13, but likewise with the fulcrum-bar 10, and such connection is effected through the medium of straps 17 and 18, which are pivoted to the central portion of the doubletree by a pin $17^a$, one strap extending across the upper face of the equalizing-bar 13 and the other strap across the under face of the said bar, and these two straps occupy a corresponding position with reference to the fulcrum-bar and are attached to the latter through the medium of a pivot-pin $17^b$, which is likewise utilized to attach the connecting-bar 19 to the said fulcrum-bar 10, as shown in Fig. 1.

In addition to the straps 17 and 18 two shorter straps 20 and 21 are employed, and these shorter straps are pivotally connected with the left-hand doubletree B' through the medium of the pivot-pin $17^a$ and are likewise pivoted to the left-hand end of the equalizing-bar 13 through the medium of the pivot-pin $19^a$, which unites the connecting-bar 19 with said equalizing-bar, the straps 20 and 21 being located one at the upper portion of the doubletree B' and the equalizing-bar 13 and the other at the under portion of the said two parts.

An equalizer constructed as above described is very simple in construction and effective in operation and prevents all side draft. It, furthermore, distributes the burden equally between the members of the team.

Having thus described my invention, I claim as new and desire to secure by Letters Patent—

1. In a draft-equalizer, a tongue or pole having an extension from the right-hand side thereof, an equalizing-bar pivoted upon the said extension, a fulcrum-bar pivoted between its center and right-hand end on the said tongue or pole, the longer portion of the fulcrum-bar extending beyond the left-hand side of the tongue or pole, straps connecting the shorter end of the fulcrum-bar with the pivot portion of the equalizing-bar, a doubletree connected directly with the equalizing-bar at its right-hand end, a second doubletree located at the left-hand end of the equalizing-bar, straps connecting the left-hand doubletree with the fulcrum-bar and with the equalizing-bar, and a connection between the left-hand ends of the equalizing and fulcrum bars, as described.

2. In a draft-equalizer, a pole or tongue, a fulcrum-bar mounted on the said tongue or pole between its center and its right-hand end, an arm projected from the right-hand side of the pole or tongue in advance of the fulcrum-bar, said arm being at a right angle to the said pole or tongue, an equalizing-bar pivoted at the right of its center to the said arm, straps connecting the pivot portion of the equalizing-bar with the shorter end of the fulcrum-bar, a doubletree pivotally connected directly with the right-hand extremity of the equalizing-bar, a second doubletree crossing said tongue or pole and located at the left-hand end of the equalizing-bar, and a connecting-bar pivotally uniting the left-hand ends of the fulcrum and the equalizing bars, straps pivotally attached to the left-hand doubletree, passing above and below the equalizing-bar, being connected at their rear ends with the longer end of the fulcrum-bar, and shorter straps connected with the left-hand doubletree at the same point as the longer straps, and pivotally connected with the equalizing-bar where the said bar receives the connecting-bar, for the purpose described.

In testimony whereof I have signed my name to this specification in the presence of two subscribing witnesses.

FRANK F. THILL.

Witnesses:
    H. Y. MARSHALL,
    GEO. G. ALLANSON.